May 18, 1926.

L. C. BAYLES

SPOOL VALVE FOR ROCK DRILLS

Filed Oct. 16, 1922 6 Sheets-Sheet 1

1,584,715

Inventor
Lewis C. Bayles
By his Attorney
Herbert G. Ogden

May 18, 1926.

L. C. BAYLES 1,584,715

SPOOL VALVE FOR ROCK DRILLS

Filed Oct. 16, 1922   6 Sheets-Sheet 3

Inventor
Lewis C. Bayles
By his Attorney
Herbert G. Ogden

Inventor
Lewis C. Bayles
By his Attorney
Herbert G. Ogden

May 18, 1926.

L. C. BAYLES 1,584,715

SPOOL VALVE FOR ROCK DRILLS

Filed Oct. 16, 1922   6 Sheets-Sheet 5

Inventor
Lewis C. Bayles
By his Attorney

May 18, 1926.

L. C. BAYLES 1,584,715

SPOOL VALVE FOR ROCK DRILLS

Filed Oct. 16, 1922    6 Sheets-Sheet 6

INVENTOR
Lewis C. Bayles.
BY
Herbert G. Ogden
HIS ATTORNEY

Patented May 18, 1926.

1,584,715

UNITED STATES PATENT OFFICE.

LEWIS CONDICT BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

SPOOL VALVE FOR ROCK DRILLS.

Application filed October 16, 1922. Serial No. 594,728.

This invention relates to fluid actuated rock drills, but more especially to a valve of the spool type for controlling the distribution of motive fluid to the cylinder of the machine. The type of spool valve to which the invention relates is preferably provided with a central head and outer heads at either side, and the valve controls both the admission of motive fluid to the cylinder and the exhaust from the cylinder.

The objects of the invention are to render the valve light, strong, quick acting and positive in its operation, so that it will start to move instantly under pressure fluid and remain held in one position in the cycle of operations until ready to be thrown to the other position in the cycle, and will be able to continue reciprocating with certainty.

The valve may be constructed in various ways with three heads, but in accordance with my invention, the outer end of one outer head of the valve is formed with an actuating face and a separate holding face forming pressure areas for actuating the valve in one direction and holding the valve until moved in the opposite direction, while independent means, preferably in the form of separate pressure areas, are provided on the valve for actuating the valve in the opposite direction and holding the valve until returned.

By constructing the valve with separate and distinct actuating and holding pressure areas, I am enabled to insure efficient operation at all times and produce valves of different forms for special purposes all operating on substantially the same fundamental principles.

The invention is illustrated in the accompanying drawings, showing so much of a rock drill as will serve to make the invention clear, and in which—

Figure 1:
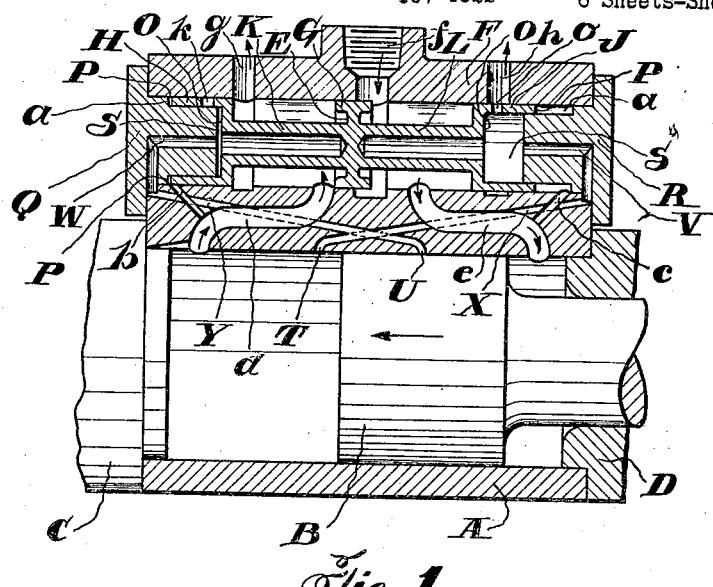
Figure 2:
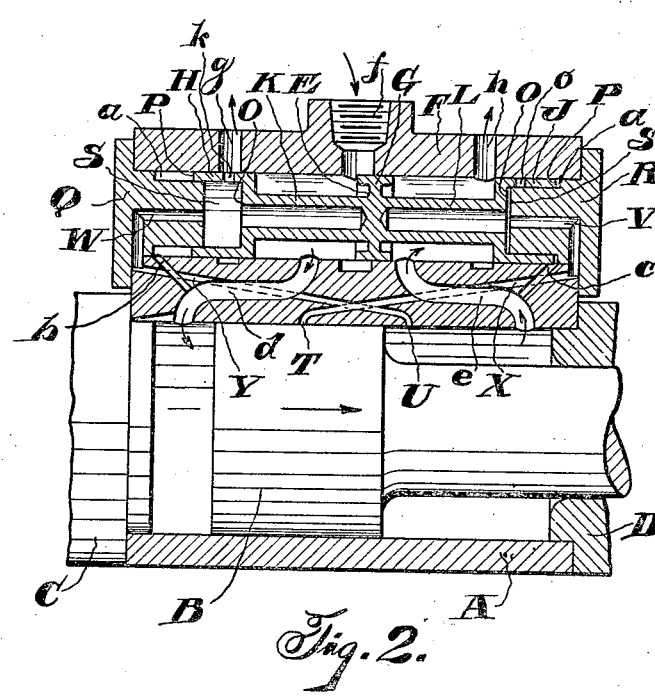
Figure 3:
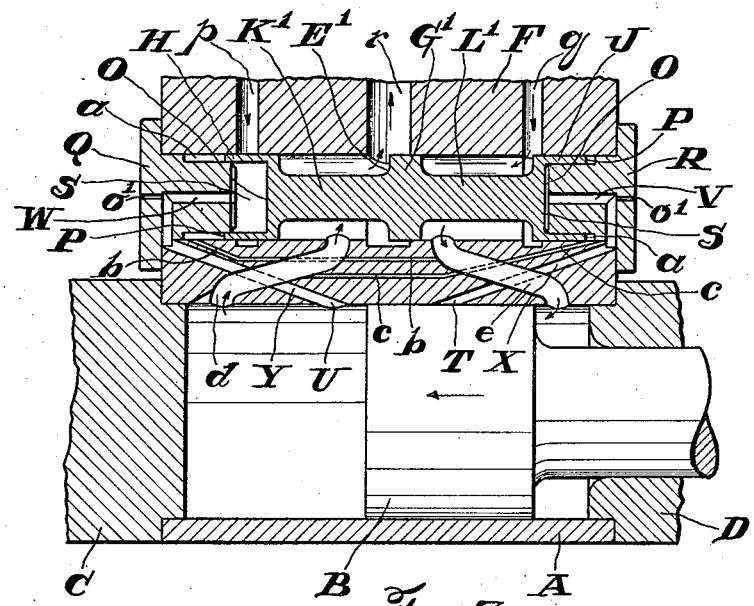
Figure 4:
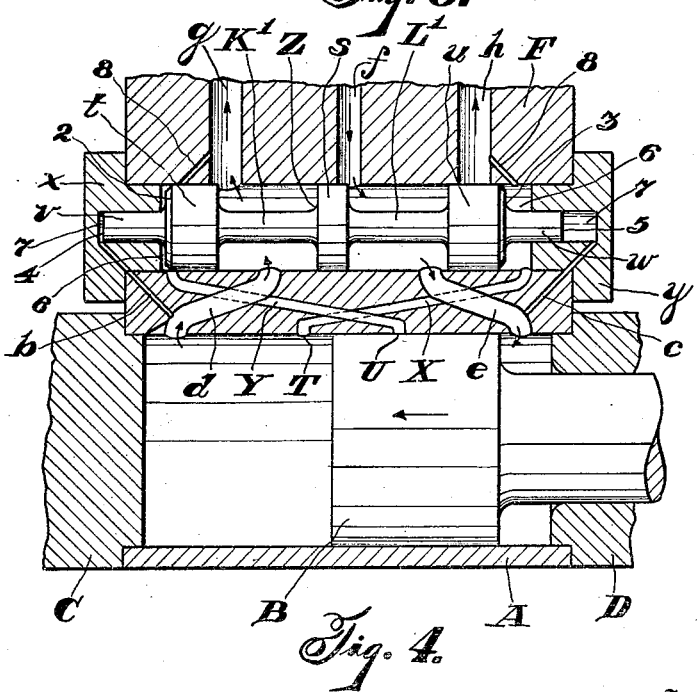
Figure 5:
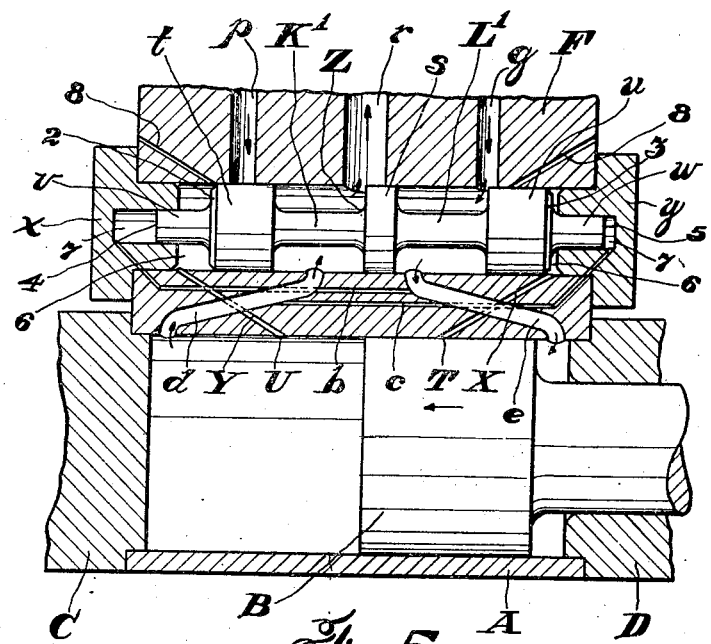
Figure 6:
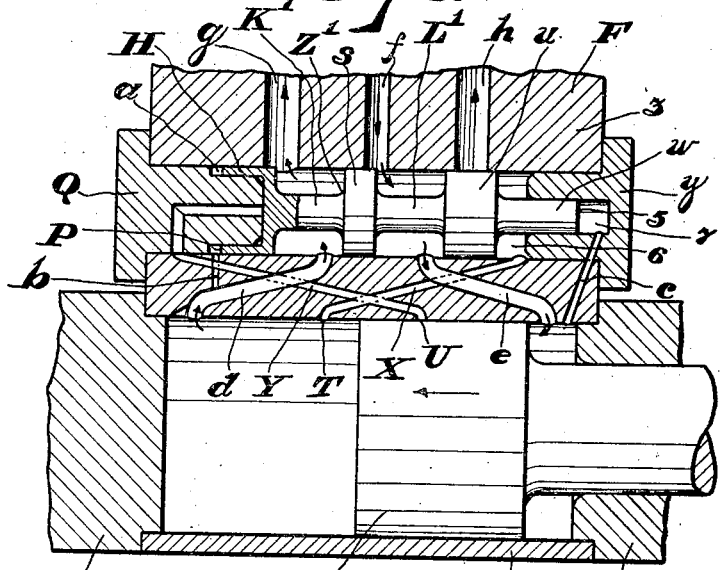
Figure 7:
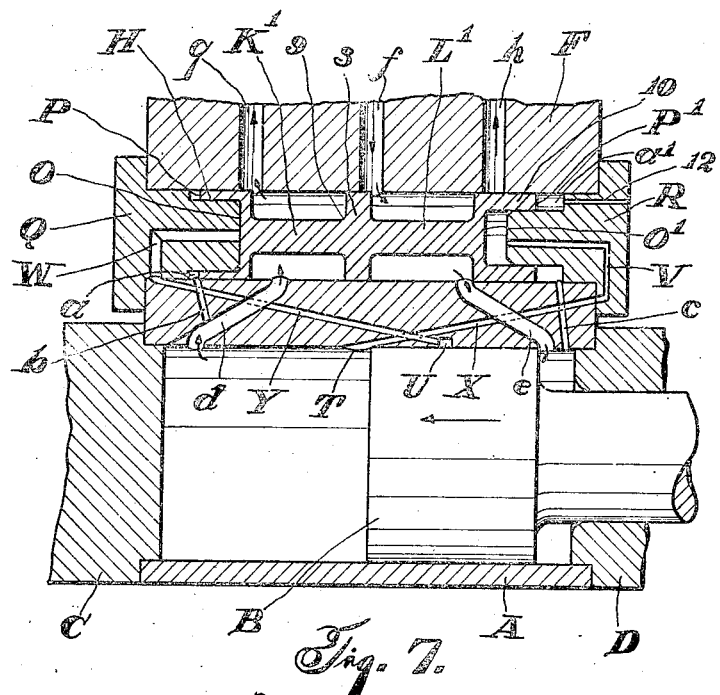
Figure 8:
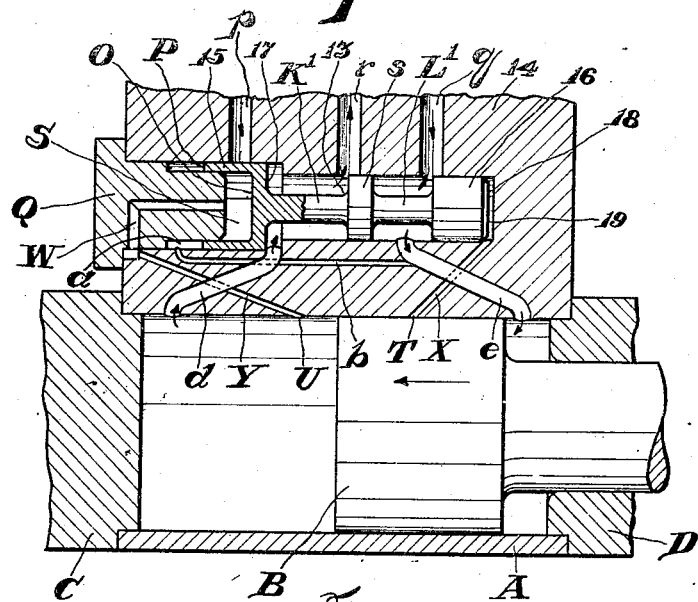
Figure 9:
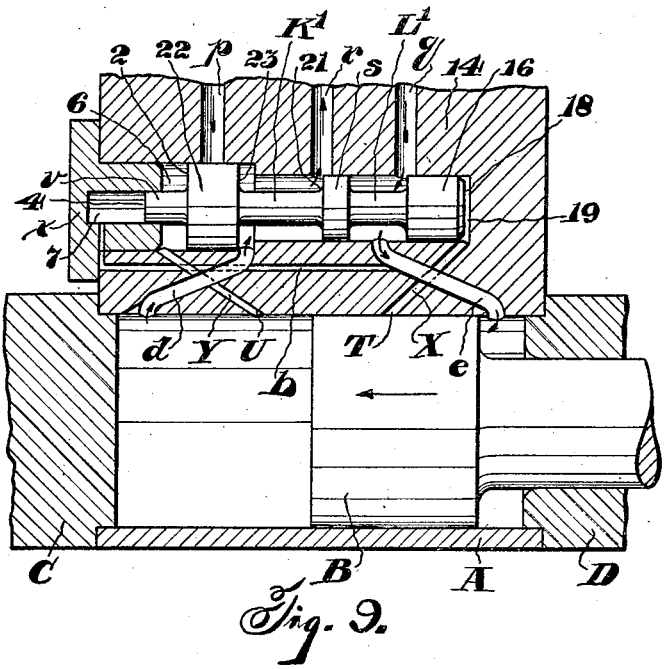
Figure 10:
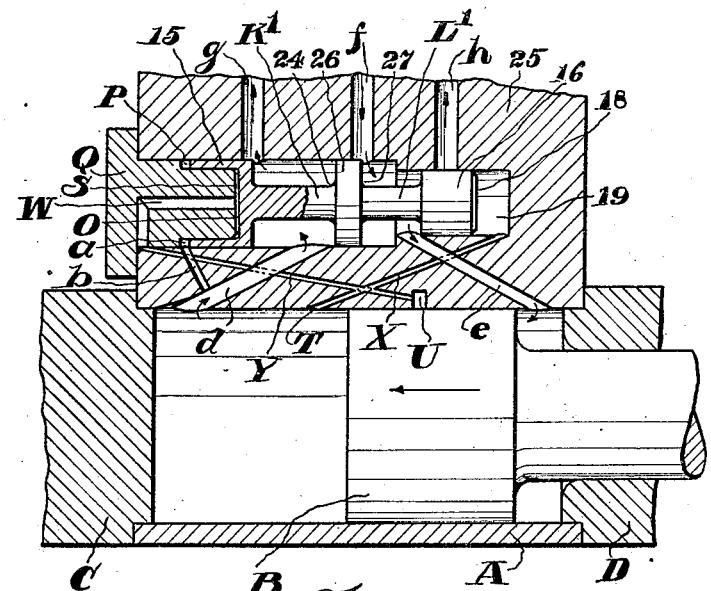
Figure 11:
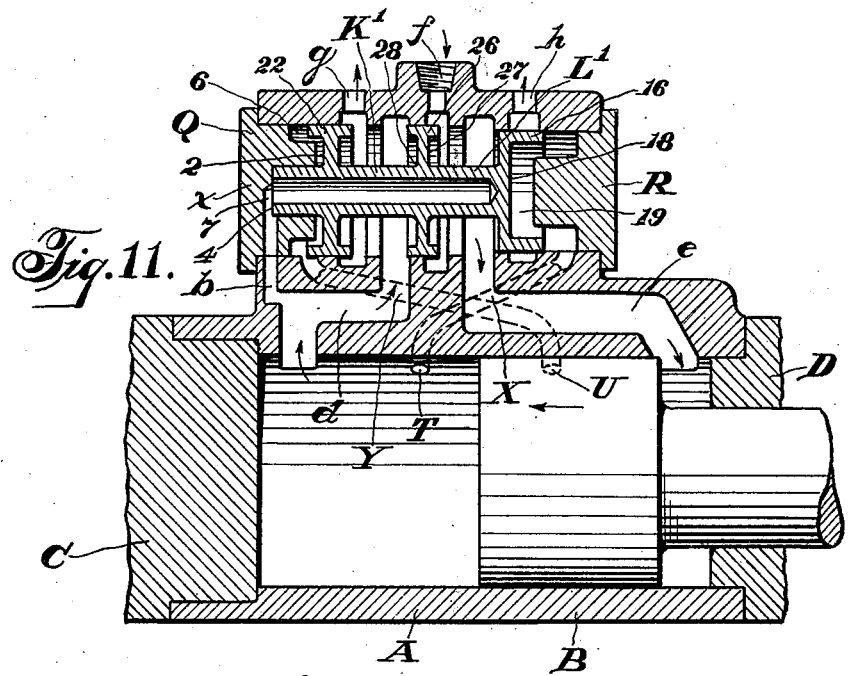
Figure 12:
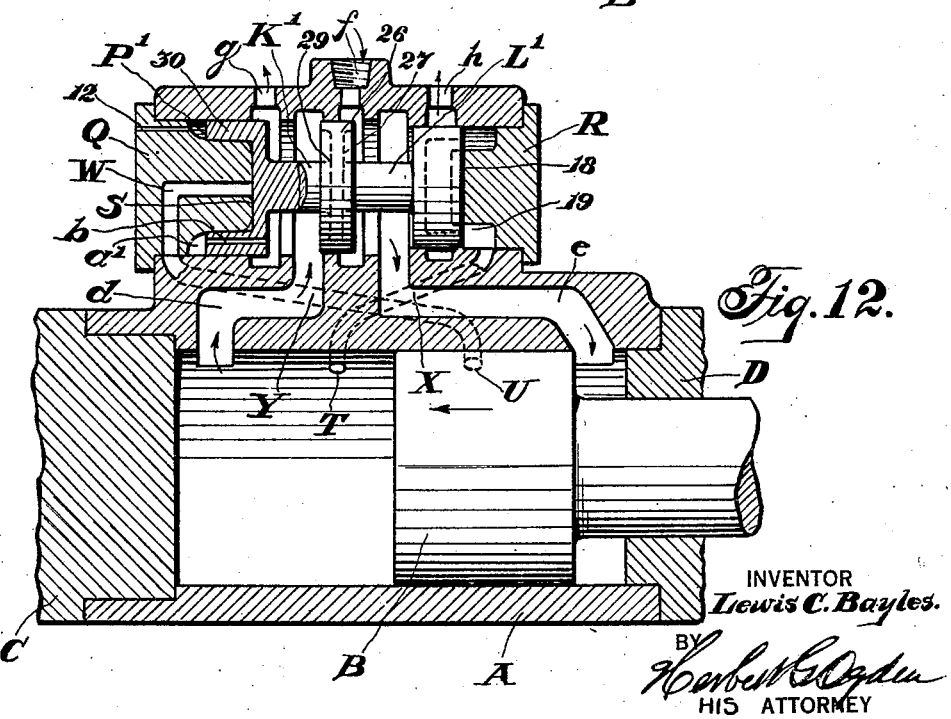

Figure 1 is a diagrammatic longitudinal sectional elevation partly broken away through a portion of the cylinder and through the valve chest of a rock drill with the valve in one position, Figure 2 is a view similar to Figure 1 with the valve in the opposite position. In both Figures 1 and 2 the inlet is at the center of the valve and the exhaust at the ends, Figure 3 is a diagrammatic longitudinal sectional view of a modification having a valve like that shown in Figures 1 and 2 but with the exhaust at the center of the valve and the inlet at the ends, Figure 4 is a diagrammatic longitudinal sectional view of a modified form of valve construction with the inlet at the center and the exhaust at the ends of the valve, Figure 5 is a view of a modification of the valve shown in Figure 4 with the inlet at the ends and the exhaust at the center of the valve, Figure 6 is a view of a modification of the valve in which the ends of the valve are dissimilar, one end being like that shown in Figure 1 and the other being like that shown in Figure 4, Figure 7 is a view of a modification in which the holding pressure areas at each end of the valve are dissimilar, Figure 8 is a view of a modification having a differential valve, Figure 9 is a view of a modification of Figure 8 in which the differential valve is differently constructed, Figure 10 is a view of another modification of a differential valve, and Figures 11 and 12 are similar views of further modifications of differential valves.

Referring to the drawings, a portion of the cylinder A of a rock drill is indicated having a reciprocating piston B adapted to impart blows of impact to a drill steel in the usual manner, if it be assumed that the machine is a hammer drill, although the invention may be applied to a piston drill in which the drill steel is bodily reciprocated by the piston or to other impact tools. The cylinder is provided with the usual back head C and front cylinder washer D, and the distribution of motive fluid to the cylinder is controlled by a valve E in the valve chest F.

In Figures 1 and 2 the valve is formed with a central head G which controls the admission of pressure fluid to the cylinder, and outer heads H and J at either side, connected to the central head G as by means of the stems or necks K and L, which are preferably hollow in order to lighten the construction. In this instance, the outer heads H and J are also hollow and by this means I form the outer end of each head with an actuating face O and a separate holding face P forming pressure areas. Plugs Q and R form closures for the ends of the valve chest F, and as shown are provided with reduced portions adapted to enter the hollow heads H and J of the valve, as the valve reciprocates.

The pressure chamber S in which one actuating face O of the valve operates, communicates with the cylinder A at a port T uncovered by the piston B near the end of its stroke in one direction, as indicated in Figure 1, and the other pressure chamber S in which the other of the said actuating faces O of the valve operates, communicates with the cylinder at a port U uncovered by the piston B near the end of its stroke in the opposite direction, as indicated in Figure 2. The plugs Q and R are provided with passages V and W registering with the passages X and Y in the cylinder, leading to the ports T and U respectively.

Each pressure chamber $a$ in which one of the holding faces P operates, is at all times in communication with that end of the cylinder to which the piston has moved when it uncovers the port leading from the valve actuating pressure chamber S at the same end of the valve, and this is accomplished through the passages $b$ and $c$, in this instance leading from the holding pressure chambers $a$ to the inlet passages $d$ and $e$ which lead from the valve chest to the cylinder, for supplying and exhausting motive fluid to and from both ends of the cylinder. In Figure 1, it will be observed that the holding pressure chamber $a$ at the right hand end of the valve, is in communication with the forward end of the cylinder through the passages $c$ and $e$, which is the end of the cylinder to which the piston has moved when it uncovers the port T leading from the valve actuating pressure chamber S at the same end of the valve. Likewise it will be observed that the holding pressure chamber $a$ at the left hand end of the valve, is in communication with the rearward end of the cylinder through the passages $b$ and $d$, which is the end of the cylinder to which the piston has moved when it uncovers the port U leading from the valve actuating pressure chamber S at the same end of the valve.

In Figures 1 and 2 the valve chest is provided with an inlet $f$ at the center, controlled by the central valve head G and the outer valve heads H and J control the main exhaust ports $g$ and $h$ respectively at the ends of the valve. If desired, the outer valve heads H and J may be provided with the radial bleeder ports $h$ and $o$ respectively adapted to register momentarily with one or the other of the main exhaust ports, depending, of course, upon the position of the valve, for relieving the pressure in one of the valve actuating pressure chambers S at the proper time. The radial bleeder ports $h$ and $o$ are preferably so positioned in the end heads H and J that they will register with their respective exhaust port, or in other words, with that exhaust port located at that end of the valve chest corresponding with the end of the cylinder into which pressure fluid is being admitted, and during such admission of pressure fluid to the cylinder.

In the operation of the valve so far disclosed, let it be assumed that the valve E is in the position indicated in Figure 1, having moved rearwardly, and the piston B is at the forward end of its stroke and is returning on its rearward stroke. Under such conditions, motive fluid entering the inlet $f$ passes around the valve stem L and through the inlet passage $e$ to the forward end of the cylinder, to return the piston. Live pressure fluid passing through the passage $c$ from the passage $e$ enters the holding pressure chamber $a$ at the right hand end of the valve, and the pressure upon the holding face P of the valve holds the valve in position, while the actuating face O of the valve in the actuating pressure chamber S is open to atmosphere through bleeder port $o$ and also open to exhaust through the passages V and X and the port T opening into the rearward end of the cylinder. The exhaust from the rearward end of the cylinder passes through the passage $d$ out through the valve chest to the exhaust port $g$.

As the piston B moves rearwardly, the port T is covered and the port U is uncovered, as indicated in Figure 2 in which case live pressure fluid passes through the passages Y and W to the valve actuating pressure chamber S at the left hand end of the valve, and the preponderance of the pressure on the actuating face O at that end of the valve over the pressure on the opposing holding face P at the opposite end of the valve, due to the fact that said last named face is of smaller area, causes the valve to be thrown forwardly to the position indicated in Figure 2, thus opening the forward end of the cylinder to exhaust through the passage $e$ and exhaust port $h$, and admitting live pressure fluid to the rearward end of the cylinder behind the piston from the inlet $f$ through the passage $d$. The holding face P at the forward or right hand end of the valve is then open to atmosphere through the passages $c$ and $e$, while the holding face P at the rearward end or left hand end of the valve is subject to live pressure fluid through the passages $d$ and $b$, thus holding the valve in its forward position until ready to be thrown rearwardly again. As shown in Figure 2 the pressure chamber S at the rearward end of the valve is open to atmosphere through bleeder port $h$ and also open to exhaust through the passages W and Y. The cycle of operations is thus repeated as the piston reciprocates.

In the modification of the invention shown in Figure 3, the valve E' is like the valve E shown in Figures 1 and 2, except that the central head G' and the valve stems K' and L', are shown diagrammatically in section, and are solid instead of being hollowed. In Figure 3, however, supply of motive fluid is carried to the valve chest and cylinder through the inlet ports $p$ and $q$ at the ends of the valve, while the central port $r$ in the valve chest, is the exhaust port. In the modification shown in Figure 3, it is necessary to so arrange and locate the passages X and Y leading to the actuating pressure chambers S and the passages $b$ and $c$ leading to the holding pressure chambers $a$, that the valve will function properly. For this purpose, the passages X and Y leading to the ports T and U respectively, are not crossed as in Figures 1 and 2, and the passages $b$ and $c$ are crossed and led to the passages $e$ and $d$ respectively. The actuating pressure chambers S in Figure 3 are provided with bleeder ports $o'$ affording communication between the passages V and W and the atmosphere. The operation of the piston and valve shown in Figure 3 is like that heretofore described, in connection with Figures 1 and 2. As the piston B returns on its rearward stroke, as indicated in Figure 3, and uncovers the port T, live pressure fluid is admitted through the passages X and V to the actuating face O at the forward end of the valve. The actuating face O at the opposite end of the valve was open to atmosphere through the passages W and Y and thence through the rearward end of the cylinder through the passages $d$ to the exhaust port $r$, so that preponderance of the pressure on the actuating face O at the forward end of the valve over the pressure on the holding face P at the opposite end of the valve will throw the valve rearwardly. Live pressure fluid will then be admitted through the passages $d$ and $c$ to the holding face P at the forward end of the valve. On the forward stroke of the piston, with the valve in its rearward position, live pressure fluid is admitted to the actuating pressure chamber S at the rearward end of the valve, as soon as the port U is uncovered by the piston, as indicated in the position of the parts in Figure 3. The valve is then thrown forward to the position indicated, and live pressure fluid is admitted to the holding pressure chamber $a$, at the rearward end of the valve through the passages $e$ and $b$. The cycle of operations is repeated during the operation of the machine.

In Figure 4 a modification of the invention is shown operating upon the principles heretofore disclosed, in which the valve Z is provided with three heads, $s$, $t$ and $u$, connected by the stems L' and K', but the outer heads $t$ and $u$ instead of being hollow, in order to form separate and distinct pressure surfaces, are in this instance provided with reduced extensions $v$ and $w$ operating within the hollow plugs $x$ and $y$. The actuating faces or pressure areas 2 and 3, are in this case formed on the main portions of the heads $t$ and $u$ while the separate and distinct holding faces or pressure areas 4 and 5 are formed at the ends of the reduced extensions $v$ and $w$. The actuating faces 2 and 3 operate in the pressure chambers 6 while the holding faces 4 and 5 operate in the pressure chambers 7 in the plugs $x$ and $y$. The actuating pressure chambers 6 are preferably formed with bleeder ports 8 connected to the exhaust ports $g$ and $h$. The ports and passages for the distribution of motive fluid to both ends of the cylinder and to both ends of the valve, are like those indicated in Figures 1 and 2, and the supply of motive fluid is at the inlet $f$ in the center of the valve, while the exhaust takes place at the exhaust ports $g$ and $h$ at the ends of the valve.

Figure 5 shows a modification similar to Figure 4 except that the exhaust takes place at the center of the valve through the exhaust port $r$ while the supply is admitted at the inlets $p$ and $q$ at the ends of the valve. It is also necessary to lead the passages X and Y to the cylinder without crossing them, as in Figure 4, and the passages $b$ and $c$ are crossed and connected to the distribution passages $e$ and $d$ respectively, which is the reverse of the connections shown in Figure 4 and similar to the connections shown in Figure 3.

In Figure 6, a modification of the invention is shown in which the valve Z' is shown with a central head $s$ and one outer head H of hollow form like the head shown in Figure 1, and another outer head $u$ like the head shown in Figure 5, having a reduced extension $w$. One plug Q is adapted to enter the hollow head H, while the other plug $y$ is provided with a recess, in which the extension $w$ enters. Motive fluid is supplied at the central inlet $f$ in the valve chest and exhausted at the exhaust ports $g$ and $h$ at the ends of the valve, so that the arrangement of ports and passages for the valve and cylinder are like those indicated in Figures 1, 2 and 4 except for the fact that the passage $c$ at the forward end of the valve leading to the holding pressure chamber 7, here communicates directly with the forward end of the cylinder instead of with the distribution passage $e$ without, however, changing the function of the passage $c$. It is not necessary in all cases to provide the bleeder ports for the actuating pressure chambers of the valves and they have been omitted in Figure 6, because the said actuating pressure chambers are respectively open to atmosphere through the respective exhaust ports, in any event, substantially at the instant that the valve is thrown, and there is also a certain amount of leakage at all times past the outer valve heads due to the necessary clearance for the operation of the valve. The provision of the bleeder ports however insures the relief of pressure in one of the valve actuating chambers, and is a preferable construction. The operation of the valve and piston in Figure 6 is like that described in connection with Figures 1, 2 and 4.

In the modification shown in Figure 7, the valve 9 is formed with the central head $s$ like Figure 6 and the hollow outer head H also like Figure 6. The other outer head 10 is hollow, but formed with thicker walls than the head H, thus providing an actuating face O' of smaller area than the opposite actuating face O, and also forming a holding face P' of larger area than the opposite holding face P. In order to reduce the pressure in the holding pressure chamber $a'$ at the forward end of the valve, a bleeder port 12 is provided through the plug R from said chamber to the atmosphere. In Figure 7 the passage $c$ is purposely made small and the bleeder port 12 is provided in order that the pressure in the holding chamber $a'$ shall at all times be considerably lower than the motive fluid pressure entering the drill. Since in Figure 7 the inlet is at the center of the valve and the exhaust ports are at the ends of the valve, the distribution ports and passages for the valve and cylinder are substantially like those indicated in Figures 1 and 2 with the exception of the passage $c$ which is led directly to the forward end of the cylinder, as in Figure 6, and the operation and function of the parts is like that indicated for Figures 1 and 2.

In Figure 8, a modification of the invention is shown in which a differential valve 13 is provided in the valve chest 14, which valve has a central head $s$ and one outer hollow head 15 of larger outer diameter than the central head $s$, while the other outer head 16 is of the same diameter as the central head $s$ and as shown is a solid head having no reduced extension, although the head 16 may be made hollow for lightness. The valve plug Q at the rearward end of the valve is adapted to enter the hollow head 15 and this head is provided with the actuating pressure face O and the holding pressure face P, as in Figure 1. The shoulder 17 formed on the head 15 being of larger area than the face of the central head $s$ constitutes a holding pressure face opposed to the holding pressure face P and the outer end 18 of the opposite outer head 16 forms the actuating pressure face, opposed to the actuating pressure face O. Pressure fluid is supplied to the machine through the inlets $p$ and $q$ at the outer ends of the valve, and the exhaust takes place at the central exhaust port $r$. The distribution passages $d$ and $e$ lead from the valve chest to the outer ends of the cylinder and a passage X leads from the actuating pressure chamber 19 for the actuating face 18, to the port T in the cylinder. Similarly, passages W and Y lead from the actuating pressure chamber S at the opposite end of the valve to the port U in the cylinder. A passage $b$ connects the holding pressure chamber $a$ at the rearward end of the valve with the distribution passage $e$. The holding pressure surface 17 is at all times in communication with one end of the cylinder through passage $d$.

In the operation of the valve and piston shown in Figure 8, let it be assumed that the piston is starting to travel rearwardly, in which case the valve is in its forward position as indicated, and motive fluid is being admitted in front of the piston. Live pressure fluid is also being supplied from the passage $e$ and through the passage $b$ to the holding pressure chamber $a$ at the rearward end of the valve, holding the valve forwardly. As soon as the piston uncovers the port T in the cylinder, the live pressure fluid is admitted through the passage X to the actuating pressure chamber 19 at the forward end of the valve, and the pressure on the actuating face 18 preponderates over the pressure in the holding pressure chamber $a$ at the opposite end of the valve, causing the valve to be thrown rearwardly. Live pressure fluid is then admitted through the inlet $p$ and passage $d$ to the rearward end of the cylinder, and the live pressure fluid on the holding pressure face 17 of the head 15 holds the valve rearwardly until it is ready to be thrown forwardly again as the piston uncovers the port U on its forward stroke. It is obvious from the modification disclosed in Figure 8 that separate and distinct actuating and holding pressure faces may be provided on different parts of the valve according to the construction of the valve heads and depending on whether or not the valve is constructed on the differential principle. As indicated in Figure 8 there may be separate actuating and holding faces at one end of the valve, while the opposed actuating and holding faces need not necessarily be at the opposite end of the valve.

Another modification showing a differential valve is illustrated in Figure 9, in which the valve 21 is provided with the central head $s$, and one outer head 22 is a solid head of larger diameter than the central head $s$ and provided with a reduced extension $v$. The opposite outer head 16 is like that indicated in Figure 8. The plug $x$ at the rearward end of the valve is provided with a recess into which the reduced extension $v$ extends and the head 22 is formed with the actuating pressure face 2, while the end of the reduced extension $v$ forms a holding pressure face 4. The actuating pressure face 2 operates in the actuating pressure chamber 6 and the holding face 4 operates in the holding pressure chamber 7. The head 16 is provided with the actuating face 18 operating in the actuating pressure chamber 19. The surface 23 of the head 22 being of larger area than the face of the central head s forms a holding face opposed to the holding face 4. The ports and passages for the valve and cylinder in Figure 9 are like those illustrated in Figure 8, and the parts operate as described in connection with Figure 8.

In the modification shown in Figure 10, a differential valve 24 is illustrated operating in the valve chest 25 and in this instance, the inlet $f$ is at the center of the valve, while the exhaust takes place at the exhaust ports $g$ and $h$ at the outer ends of the valve. The central head 26 is of the same diameter as the outer hollow head 15 while the opposite outer head 16 is of smaller diameter than either of the other two heads. In this modification, the surface 27 of the central head 26 being larger than the head 16, forms the holding face for holding the valve rearwardly; and otherwise the actuating and holding surfaces are like those shown in connection with the modification illustrated in Figure 8. Since the inlet is at the center of the valve, the passages X and Y leading to the respective actuating pressure chambers 19 and S of the valve are crossed and the passage $b$ leading from the holding pressure chamber $a$ at the rearward end of the valve is connected to the distribution passage $d$.

In the operation of the modification shown in Figure 10 the piston is indicated starting on its rearward stroke, and motive fluid is being admitted from the inlet $f$ through the passage $e$ to the forward end of the cylinder. The valve is being held rearwardly by live pressure fluid on the holding face 27 of the central head 26. When the piston uncovers the port U in the cylinder, live pressure fluid passes through the passages Y and W to the actuating pressure chamber S at the rearward end of the valve, and the valve is thrown forward by the preponderance of the pressure upon the actuating face O since this face is of larger area than the holding face 27 of the central head 26. The valve is held in its forward position as long as necessary, by live pressure fluid through the passage $b$ leading to the holding pressure chamber $a$. As the piston travels forwardly and uncovers the port T, live pressure fluid is admitted through the passage X to the actuating pressure chamber 19 at the forward end of the valve, and the valve is caused to move rearwardly by the pressure on the actuating face 18. The cycle continues as the piston reciprocates.

In the modification shown in Figure 11, the valve 28 is like that shown in Figure 10 with the exception that the outer head 22 of the valve shown in Figure 9 is substituted for the head 15, and the plug $x$ cooperating with the head 22 is used in place of the plug Q. The ports and passages are arranged and located in the same manner in Figure 11 as in Figure 10, and the operation of the valve in Figure 11 is like that in Figure 10, since the motive fluid is supplied at the center inlet $f$ and exhausted at the exhaust ports $g$ and $h$ at the ends of the valve. One possible advantage of the head 22 over the head 15 resides in the fact that the use of a peripheral flange on the head is avoided in order to obtain a holding face, and the valve head is thus made stronger because if the flange upon which the holding face P shown in Figure 10 is located, is made too thin, a weakness may result. The valve shown in Figure 11 is preferably made as light as possible, eliminating metal where possible, as for instance in the heads and in the stem, and these parts are preferably hollowed as indicated in the drawings.

In the modification shown in Figure 12, the valve 29 is also like that shown in Figure 10 with the exception that the peripheral flange of the hollow head 30 is made of substantial thickness, thus producing a holding face P' of increased area, substantially like the holding face P' shown on the head 10 in Figure 7, and in order to reduce the pressure in the holding pressure chamber $a'$, a bleeder port 12 is preferably provided leading to the atmosphere, as in Figure 7. The ports and passages in Figure 12 are like those shown in Figures 10 and 11, except that the passage $b$ is located directly in the head 30 in order to connect the holding pressure chamber $a'$ with a portion of the valve chest to which live fluid pressure is intermittently supplied.

It is obvious that the different features shown in different modifications illustrated in the drawings, may be combined to form further modifications without departing from the spirit of the invention, as defined in the appended claims.

I claim:

1. In a rock drill, the combination of a cylinder and reciprocating piston, a valve chest having a plurality of pressure chambers at each end, said valve chest having inlet passages leading to the cylinder and main exhaust ports leading to the atmosphere, a fluid actuated valve in said valve chest for controlling said piston, said valve having a central head to control the admission of pressure fluid to the cylinder and outer heads at either side to control the main exhaust ports, the outer end of one outer head of the valve having an actuating face and a separate holding face forming pressure areas, the pressure chamber in which the said actuating face operates communicating with the cylinder through a passage uncovered by the piston near the end of its stroke in one direction, and the pressure chamber in which the said holding face operates being at all times in communication with that end of the cylinder to which the piston has moved when it uncovers the passage leading from the said valve actuating pressure chamber, independent means for actuating and holding the valve in the opposite direction, said end heads having bleeder ports to register momentarily with the main exhaust ports for exhausting pressure fluid acting against the actuating faces of the valve.

2. In a rock drill, the combination of a cylinder and reciprocating piston, a valve chest having a plurality of pressure chambers at each end, said valve chest having inlet passages leading to the cylinder and main exhaust ports leading to the atmosphere, a fluid actuated valve in said valve chest for controlling said piston, said valve having a central head to control the admission of pressure fluid to the cylinder, and outer heads of the same diameter at either side to control the main exhaust ports, the outer ends of the outer heads of the valve each having an actuating face and a separate holding face forming pressure areas, one of the pressure chambers in which one of the said actuating faces operates communicating with the cylinder through a passage uncovered by the piston near the end of its stroke in one direction, and the other pressure chamber in which the other of the said actuating faces operates communicating with the cylinder through a passage uncovered by the piston near the end of its stroke in the opposite direction, each pressure chamber in which one of the said holding faces operates being at all times in communication with that end of the cylinder to which the piston has moved when it uncovers the passage leading from the valve actuating pressure chamber at the same end of the valve, said end heads having radial bleeder ports to register momentarily with the main exhaust ports for exhausting a portion of the pressure fluid utilized for throwing the valve.

3. In a rock drill, the combination of a cylinder and reciprocating piston, a valve chest having a plurality of pressure chambers at each end, said valve chest having inlet passages leading to the cylinder and main exhaust ports leading to the atmosphere, and a fluid actuated valve in said valve chest for controlling said piston, said valve having a central head to control the admission of pressure fluid to the cylinder, and outer heads of the same diameter at either side to control the main exhaust ports, the outer ends of the outer heads of the valve each having an actuating face and a separate holding face forming pressure areas, one of said areas at each end being formed on the outer head itself at that end, the pressure chambers for the said actuating faces communicating with the cylinder through passages on opposite sides of the center and adjacent to the center, the pressure chambers for the said holding faces communicating with the cylinder at all times through passages near the ends farthest away from the points at which the passages for the said actuating faces for the same valve ends communicate with the cylinder, said end heads having radial bleeder ports to register momentarily with the main exhaust ports for exhausting a portion of the pressure fluid acting against the actuating faces of the valve.

4. In a rock drill, the combination of a cylinder and reciprocating piston, a valve chest having a plurality of pressure chambers at each end, said valve chest having inlet passages leading to the ends of the cylinder and main exhaust ports leading to the atmosphere, a fluid actuated valve in said valve chest for controlling said piston, said valve having a central head to control the admission of pressure fluid to the cylinder, and an outer head on either side to control the main exhaust ports, the outer ends of the outer heads of the valve each having an actuating face and a separate holding face forming pressure areas, the pressure chambers for the said holding faces communicating at all times with the cylinder near the ends, the pressure chambers for the said actuating faces communicating with the cylinder at points between mid-center and the ends opposite to the ends with which the pressure chambers for the said holding faces communicate, the force exerted on each of said actuating faces being greater than that exerted on each of the said holding faces, said end heads having radial bleeder ports to register momentarily with the main exhaust ports for exhausting a portion of the pressure utilized for throwing the valve, said bleeder ports being adapted to register with the main exhaust port located at that end of the valve chest corresponding with the end of the cylinder into which pressure fluid is being admitted and during such admission of pressure fluid to the cylinder.

In testimony whereof I have signed this specification.

LEWIS CONDICT BAYLES.